US008361357B2

(12) United States Patent
Cardozo et al.

(10) Patent No.: US 8,361,357 B2
(45) Date of Patent: Jan. 29, 2013

(54) SPRAY-DRYING PROCESS

(75) Inventors: Larry Savio Cardozo, Newcastle upon Tyne (GB); Hossam Hassan Tantawy, Northumberland (GB); James Robert Lickiss, Northumberland (GB); Nigel Patrick Somerville Roberts, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/968,413

(22) Filed: Dec. 15, 2010

(65) Prior Publication Data

US 2012/0153521 A1 Jun. 21, 2012

(30) Foreign Application Priority Data

Dec. 18, 2009 (EP) .................................... 09179944

(51) Int. Cl.
*B29B 9/00* (2006.01)

(52) U.S. Cl. ........................................................ 264/13

(58) Field of Classification Search .................. 264/130, 264/13

See application file for complete search history.

(56) References Cited

U.S. PATENT DOCUMENTS

| | | | | |
|---|---|---|---|---|
| 4,102,057 | A | 7/1978 | Key et al. | |
| 4,155,882 | A | 5/1979 | Davies et al. | |
| 4,261,850 | A | 4/1981 | Manders et al. | |
| 4,818,424 | A | 4/1989 | Evans et al. | |
| 4,820,441 | A | 4/1989 | Evans et al. | |
| 7,446,085 | B2 | 11/2008 | Imaizumi et al. | |
| 7,811,980 | B1 | 10/2010 | Tantawy et al. | |
| 7,842,657 | B2 | 11/2010 | Tantawy et al. | |
| 2003/0203832 | A1 | 10/2003 | Boucher et al. | |
| 2006/0069007 | A1 * | 3/2006 | Boucher et al. | 510/446 |
| 2009/0325850 | A1 | 12/2009 | Tantawy et al. | |
| 2011/0146099 | A1 | 6/2011 | Cardoza et al. | |
| 2011/0147962 | A1 | 6/2011 | Cardoza et al. | |
| 2011/0147963 | A1 | 6/2011 | Cardoza et al. | |
| 2011/0147964 | A1 | 6/2011 | Cardoza et al. | |

FOREIGN PATENT DOCUMENTS

| | | | |
|---|---|---|---|
| DE | 25 19 655 | A1 | 11/1976 |
| EP | 1914297 | A1 | 4/2008 |
| EP | 2 138 565 | A1 | 12/2009 |
| EP | 2 138 566 | A1 | 12/2009 |
| GB | 2020687 | A | 11/1979 |
| GB | 1595293 | A | 8/1981 |
| WO | WO96/03488 | A1 | 2/1996 |
| WO | WO 99/19453 | A1 | 4/1999 |
| WO | WO 2009/158221 | A1 | 12/2009 |
| WO | WO 2009/158449 | A1 | 12/2009 |

OTHER PUBLICATIONS

Search Report and Written Opinion from the International Searching Authority, mailed on Mar. 9, 2011, International Application No. PCT/US2010/060060, 11 pages.
International Search Report mailed Mar. 16, 2011 for International Application Serial No. PCT/US2010/060468, 10 pages.
International Search Report mailed Mar. 16, 2011 for International Application Serial No. PCT/US2010/060419, 10 pages.
International Search Report mailed Mar. 16, 2011 for International Application Serial No. PCT/US2010/060470, 11 pages.
International Search Report mailed Mar. 17, 2011 for International Application Serial No. PCT/US2010/059432, 10 pages.
Non-Final Office Action mailed Nov. 25, 2011 for U.S. Appl. No. 12/966,319, 8 pages.
Non-Final Office Action mailed Oct. 5, 2011 for U.S. Appl. No. 12/966,410, 8 pages.
Non-Final Office Action mailed Nov. 23, 2011 for U.S. Appl. No. 12/968,511, 9 pages.
Non-Final Office Action mailed Sep. 28, 2011 for U.S. Appl. No. 12/968,567, 24 pages.
Final Office Action mailed Feb. 23, 2012 for U.S. Appl. No. 12/968,567, 7 pages.

* cited by examiner

*Primary Examiner* — Larry Thrower
(74) *Attorney, Agent, or Firm* — Tiffany M Zerby; Gary J Foose

(57) ABSTRACT

A process for preparing a spray-dried detergent powder having: (i) detersive surfactant; and (ii) other detergent ingredients; wherein the process has the steps of: (a) dosing an aqueous detergent slurry into a drop tank; (b) transferring the aqueous detergent slurry from the drop tank to a pipe, and transferring the aqueous detergent slurry along the pipe through at least one pump to a spray nozzle; (c) contacting a detergent ingredient to the aqueous detergent slurry in the pipe to form a mixture; (d) spraying the mixture through the spray nozzle into a spray-drying tower; and (e) spray-drying the mixture to form a spray-dried powder, wherein the ratio of (i) the volume of the pipe of step (b) in liters to (ii) the volume of the drop tank of step (a) in liters is less than 1:1.

10 Claims, No Drawings

SPRAY-DRYING PROCESS

FIELD OF THE INVENTION

The present invention relates to a spray-drying process.

BACKGROUND OF THE INVENTION

Spray-drying is the standard method for manufacturing laundry detergent base powder. Typically, detergent ingredients are mixed together to form an aqueous detergent slurry in a mixer, such as a crutcher mixer. This slurry is then transferred through at least one pump to a spray nozzle, and the slurry is sprayed into a spray-drying tower, and spray-dried to form a spray-dried powder.

Typically, multiple chemically different formulations are manufactured on the same spray-drying equipment. This leads to the production of excessive quantities of unwanted material during the change over from one formulation to another. This is due to the need to flush the first formulation ingredients out of the spray-drying equipment, such as flushing the drop tank and pipe leading to the spray nozzle. In addition, there is an unwanted excessive time delay between manufacturing runs whilst this flushing is carried out. This reduces the overall efficiency and production capacity of the spray-dying process.

The Inventors have overcome the above problems by introducing a detergent ingredient, such as detergent ingredients that vary from one formulation to another, later in the spray-drying process, such as dosing them into the pipe after the drop tank. In addition, the inventors have found that by carefully selecting the dimensions, so as to carefully control, the volume of the pipe connecting the drop tank to the spray nozzle in relation to the volume of the drop tank, and in addition by carefully controlling the point at which the detergent ingredient is dosed into the pipe, the amount of flushing is reduced. This in turn means that the change over time between the production of different formulations on the spray-dying equipment is significantly reduced, and the overall efficiency and production capacity of the spray-dying process is dramatically improved.

SUMMARY OF THE INVENTION

The present invention relates to a process according to claim 1.

DETAILED DESCRIPTION OF THE INVENTION

Process for Preparing a Spray-Dried Detergent Powder

The process comprises the steps of: (a) dosing an aqueous detergent slurry into a drop tank; (b) transferring the aqueous detergent slurry from the drop tank to a pipe, and transferring the aqueous detergent slurry along the pipe through at least one pump to a spray nozzle; (c) contacting a detergent ingredient to the aqueous detergent slurry in the pipe to form a mixture; (d) spraying the mixture through the spray nozzle into a spray-drying tower; and (e) spray-drying the mixture to form a spray-dried powder. Preferably, the ratio of (i) the volume of the pipe of step (b) in liters to (ii) the volume of the drop tank of step (a) in liters is less than 1:1, preferably less than 0.5:1, or less than 0.2:1, more preferably less than 0.1:1, and preferably from 0.00001:1 to less than 1:1.

Preferably, the ratio of (i) the volume of the pipe in step (b) from the point at which the detergent ingredient is dosed into the pipe to the end of the pipe exiting the spray-pressure nozzle in liters to (ii) the volume of the drop tank of step (a) in liters is less than 1:1, preferably less than 0.5:1, or less than 0.2:1, more preferably less than 0.1:1, and preferably from 0.00001:1 to less than 1:1.

For the purpose of the present invention, the volume of the pipe includes the total volume of all process equipment through which the aqueous detergent slurry is transferred downstream of the drop tank, i.e. from the point of exiting the drop tank, to the point of exiting the spray nozzle. This would include the volume of any pumps, disintegrators, intermediate storage and/or transfer vessels through which the aqueous detergent slurry travels during its transfer to the spray nozzle. To be very clear, the volume of the spray-drying tower is not included when determining the volume of the pipe.

The volume of the process equipment can be determined by any suitable method, for example filling the equipment with a measured amount of water until the equipment is full: the volume of water needed to fill the equipment is the volume of the equipment.

Step (a): The aqueous detergent slurry is dosed into a drop tank. Typically, the aqueous slurry is prepared by mixing detergent ingredients and water in a mixer, such as a crutcher mixer. The Aqueous detergent slurry is then typically transferred to, and dosed into, a drop tank Step (b): the aqueous detergent slurry is transferred from the drop tank to a pipe and transferred along the pipe through at least one pump to a spray nozzle. Typically, the aqueous detergent slurry is transferred in a pipe The aqueous detergent slurry is transferred through at least one pump, preferably at least two, or even at least three or more pumps, although one or two, preferably two pumps may be preferred. Typically, when two or more pumps are used, the first pump is a low pressure pump, such as a pump that is capable of generating a pressure of from $3\times10^5$ to $1\times10^6$ Pa, and the second pump is a high pressure pump, such as a pump that is capable of generating a pressure of from $2\times10^6$ to $1\times10^7$ Pa. Optionally, the aqueous detergent slurry is transferred through a disintegrator, such as disintegrators supplied by Hosakawa Micron. The disintegrator can be position before the pump, or after the pump. If two or more pumps are present, then the disintegrator can also be positioned between the pumps. Typically, the pumps, disintegrators, intermediate storage vessels, if present, are all in series configuration. However, some equipment may be in a parallel configuration. A suitable spray nozzle is a Spray Systems T4 Nozzle.

Step (c): contacting a detergent ingredient to the aqueous detergent slurry in the pipe to from a mixture. Preferably, the detergent ingredient is contacted to the aqueous detergent slurry in the pipe after the drop tank and before the spray nozzle to form a mixture. Suitable detergent ingredients for use in step (c) are described in more detail later in the description. Preferably, the mixture formed in step (c) comprises from 20 wt % to 35 wt % water.

Step (c) can be carried out in any position after the drop tank and before the spray nozzle. However, preferably step (c) is carried out after the aqueous detergent slurry has been transferred through at least one pump, although step (c) may be carried out before the aqueous detergent slurry has been transferred through at least one pump. In a preferred embodiment, the aqueous detergent slurry is transferred through at least two pumps, and step (c) is carried out after the aqueous detergent slurry has been transferred through the first pump but before the aqueous detergent slurry enters the second pump. Preferably, during step (c) the pipe is at a pressure of from $3\times10^5$ to $1\times10^6$ Pa. However, it may be preferred for step (c) to be carried out immediately before the spray nozzle.

In step (c), it may be preferred that additionally sodium chloride is contacted to the aqueous detergent slurry after the mixer and before the spray nozzle.

Step (d): the mixture formed in step (c) is sprayed through the spray nozzle into a spray-drying tower. Preferably, the mixture is at a temperature of from 60° C. to 130° C. when it is sprayed through the spray nozzle into a spray-drying tower. Suitable spray-drying towers are co-current or counter-current spray-drying towers. The mixture is typically sprayed at a pressure of from $6\times10^6$ Pa to $1\times10^7$ Pa.

Step (e): the mixture is spray-dried to form a spray-dried powder. Preferably, the exhaust air temperature is in the range of from 60° C. to 100° C.

Aqueous Detergent Slurry

The aqueous detergent slurry typically comprises detergent ingredients, such as alkalinity source, polymer, builder, detersive surfactant, filler salts and mixtures thereof. However, it may be especially preferred for the aqueous detergent slurry to comprise low levels, or even be free, of detersive surfactant. It may also be especially preferred for the aqueous detergent slurry to comprise low levels, or even be free, of builder. Preferably, the aqueous detergent slurry comprises from 0 wt % to 5 wt %, or to 4 wt %, or to 3 wt %, or to 2 wt %, or to 1 wt % detersive surfactant. It may even be preferred for the aqueous detergent slurry to be essentially free of detersive surfactant. By essentially free of it is typically meant herein to mean: "comprises no deliberately added".

It may be highly advantageous for the aqueous detergent slurry to comprise low levels, or even be completely free, of detersive surfactants that are difficult to process when in slurry form and exposed to the residency time and process conditions typically experienced by an aqueous detergent slurry during a conventional spray-drying process. Such detersive surfactants include mid-chain branched detersive surfactants, especially mid-chain branched anionic detersive surfactants, and/or alkoxylated detersive surfactants, especially alkoxylated anionic detersive surfactants. Preferably, the aqueous detergent slurry formed in step (a) comprises from 0 wt % to 2 wt %, preferably to 1 wt % mid-chain branched detersive surfactant. Preferably, the aqueous detergent slurry formed in step (a) is essentially free from mid-chain branched detersive surfactant. By essentially free from, it is typically meant herein to mean: "comprises no deliberately added". Preferably, the aqueous detergent slurry formed in step (a) comprises from 0 wt % to 2 wt %, preferably to 1 wt % alkoxylated detersive surfactant. Preferably, the aqueous detergent slurry formed in step (a) is essentially free from alkoxylated detersive surfactant. By essentially free from, it is typically meant herein to mean: "comprises no deliberately added".

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % zeolite builder. Preferably, the aqueous detergent slurry is essentially free of zeolite builder.

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % phosphate builder. Preferably, the aqueous detergent slurry is essentially free of phosphate builder.

Preferably the aqueous detergent slurry is alkaline. Preferably, the aqueous detergent slurry has a pH of greater than 7.0, preferably greater than 7.7, or greater than 8.1, or even greater than 8.5, or greater than 9.0, or greater than 9.5, or greater than 10.0, or even greater than 10.5, and preferably to 14, or to 13, or to 12.

Spray-Dried Detergent Powder

The spray-dried detergent powder typically comprises: (i) detersive surfactant; and (ii) other detergent ingredients. Highly preferably, the spray-dried detergent powder comprises: (a) from 0 wt % to 10 wt % zeolite builder; (b) from 0 wt % to 10 wt % phosphate builder; and (c) optionally from 0 wt % to 15 wt % silicate salt.

The spray-dried detergent powder is suitable for any detergent application, for example: laundry, including automatic washing machine laundering and hand laundering, and even bleach and laundry additives; hard surface cleaning; dish washing, especially automatic dish washing; carpet cleaning and freshening. However, highly preferably, the spray-dried detergent powder is a spray-dried laundry detergent powder.

The spray-dried detergent powder can be a fully formulated detergent product, such as a fully formulated laundry detergent product, or it can be combined with other particles to form a fully formulated detergent product, such as a fully formulated laundry detergent product. The spray-dried laundry detergent particles may be combined with other particles such as: enzyme particles; perfume particles including agglomerates or extrudates of perfume microcapsules, and perfume encapsulates such as starch encapsulated perfume accord particles; surfactant particles, such as non-ionic detersive surfactant particles including agglomerates or extrudates, anionic detersive surfactant particles including agglomerates and extrudates, and cationic detersive surfactant particles including agglomerates and extrudates; polymer particles including soil release polymer particles, cellulosic polymer particles; filler particles including sulphate salt particles, especially sodium sulphate particles; buffer particles including carbonate salt and/or silicate salt particles, preferably a particle comprising carbonate salt and silicate salt such as a sodium carbonate and sodium silicate co-particle, and particles and sodium bicarbonate; other spray-dried particles; fluorescent whitening particles; aesthetic particles such as coloured noodles or needles or lamellae particles; bleaching particles such as percarbonate particles, especially coated percarbonate particles, including carbonate and/or sulphate coated percarbonate, silicate coated percarbonate, borosilicate coated percarbonate, sodium perborate coated percarbonate; bleach catalyst particles, such as transition metal catalyst bleach particles, and imine bleach boosting particles; performed peracid particles; hueing dye particles; and any mixture thereof.

In a highly preferred embodiment of the present invention, the spray-dried detergent powder comprises: (a) from 15 wt % to 30 wt % detersive surfactant; (b) from 0 wt % to 4 wt % zeolite builder; (c) from 0 wt % to 4 wt % phosphate builder; and (d) optionally from 0 wt % to 15 wt % silicate salt.

The spray-dried powder typically comprises from 0 wt % to 7 wt %, preferably from 1 wt % to 5 wt %, and preferably from 2 wt % to 3 wt % water.

The spray-dried particle is typically flowable, typically having a cake strength of from 0 N to 20 N, preferably from 0 N to 15 N, more preferably from 0 N to 10 N, most preferably from 0 N to 5 N. The method to determine the cake strength is described in more detail elsewhere in the description.

Method for Measuring Cake Strength

A smooth plastic cylinder of internal diameter 6.35 cm and length 15.9 cm is supported on a suitable base plate. A 0.65 cm hole is drilled through the cylinder with the centre of the hole being 9.2 cm from the end opposite the base plate.

A metal pin is inserted through the hole and a smooth plastic sleeve of internal diameter 6.35 cm and length 15.25 cm is placed around the inner cylinder such that the sleeve can move freely up and down the cylinder and comes to rest on the metal pin. The space inside the sleeve is then filled (without tapping or excessive vibration) with the spray-dried powder such that the spray-dried powder is level with the top of the sleeve. A lid is placed on top of the sleeve and a 5 kg weight placed on the lid. The pin is then pulled out and the spray-dried powder is allowed to compact for 2 minutes. After 2 minutes the weight is removed, the sleeve is lowered to expose the powder cake with the lid remaining on top of the powder.

A metal probe is then lowered at 54 cm/min such that it contacts the centre of the lid and breaks the cake. The maximum force required to break the cake is recorded and is the result of the test. A cake strength of 0 N refers to the situation where no cake is formed.

Detergent Ingredient Suitable for Contacting to the Aqueous Detergent Slurry in Step (c)

Any detergent ingredient can be used for contacting the aqueous detergent slurry in step (c). However, highly preferred detergent ingredients are selected from: alkyl benzene sulphonic acid or salt thereof; polymer; alkoxylated detersive surfactant; sodium hydroxide; mid-chain branched detersive surfactant; cationic detersive surfactant; and mixtures thereof.

Preferably, in step (c) the detergent ingredient comprises alkyl benzene sulphonic acid or salt thereof. Preferably, in step (c) the detergent ingredient comprises polymer. Preferably, in step (c) the detergent ingredient comprises alkoxylated detersive surfactant. Preferably, in step (c) the detergent ingredient comprises sodium hydroxide. Preferably, in step (c) the detergent ingredient comprises mid-chain branched detersive surfactant. Preferably, in step (c) the detergent ingredient comprises cationic detersive surfactant.

Detersive Surfactant

Suitable detersive surfactants include anionic detersive surfactants, non-ionic detersive surfactant, cationic detersive surfactants, zwitterionic detersive surfactants and amphoteric detersive surfactants.

Preferred anionic detersive surfactants include sulphate and sulphonate detersive surfactants.

Preferred sulphonate detersive surfactants include alkyl benzene sulphonate, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Preferred sulphate detersive surfactants include alkyl sulphate, preferably $C_{8-18}$ alkyl sulphate, or predominantly $C_{1-2}$ alkyl sulphate.

Another preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

The alkyl sulphate, alkyl alkoxylated sulphate and alkyl benzene sulphonates may be linear or branched, substituted or un-substituted.

Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, preferably having an average degree of alkoxylation of from 1 to 30; alkylpolysaccharides, preferably alkylpolyglycosides; polyhydroxy fatty acid amides; ether capped poly(oxyalkylated) alcohol surfactants; and mixtures thereof.

Preferred non-ionic detersive surfactants are alkyl polyglucoside and/or an alkyl alkoxylated alcohol.

Preferred non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate. Preferred cationic detersive surfactants are mono-$C_{6-18}$ alkyl mono-hydroxyethyl di-methyl quaternary ammonium chlorides. Highly preferred cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Polymer

The polymer can be any suitable polymer.

One suitable polymer is an amphiphilic graft polymer (AGP). Suitable AGPs are obtainable by grafting a polyalkylene oxide of number average molecular weight from about 2,000 to about 100,000 with vinyl acetate, which may be partially saponified, in a weight ratio of polyalkylene oxide to vinyl acetate of about 1:0.2 to about 1:10. The vinyl acetate may, for example, be saponified to an extent of up to 15%. The polyalkylene oxide may contain units of ethylene oxide, propylene oxide and/or butylene oxide. Selected embodiments comprise ethylene oxide.

In some embodiments the polyalkylene oxide has a number average molecular weight of from about 4,000 to about 50,000, and the weight ratio of polyalkylene oxide to vinyl acetate is from about 1:0.5 to about 1:6. A material within this definition, based on polyethylene oxide of molecular weight 6,000 (equivalent to 136 ethylene oxide units), containing approximately 3 parts by weight of vinyl acetate units per 1 part by weight of polyethylene oxide, and having itself a molecular weight of about 24,000, is commercially available from BASF as Sokalan HP22.

Suitable AGPs may be present in the detergent composition at weight percentages of from about 0 to about 5%, preferably from about above 0% to about 4%, or from about 0.5% to about 2%. In some embodiments, the AGP is present at greater than about 1.5 wt %. The AGPs are found to provide excellent hydrophobic soil suspension even in the presence of cationic coacervating polymers.

Preferred AGPs are based on water-soluble polyalkylene oxides as a graft base and side chains formed by polymerization of a vinyl ester component. These polymers having an average of less than or equal to one graft site per 50 alkylene oxide units and mean molar masses (Mw) of from about 3000 to about 100,000.

Another suitable polymer is polyethylene oxide, preferably substituted or unsubstituted.

Another suitable polymer is cellulosic polymer, preferably selected from alkyl cellulose, alkyl alkoxyalkyl cellulose, carboxylalkyl cellulose, alkyl carboxyalkyl, more preferably selected from carboxymethyl cellulose (CMC) including blocky CMC, methyl cellulose, methyl hydroxyethyl cellulose, methyl carboxymethyl cellulose, and mixtures thereof.

Other suitable polymers are soil release polymers. Suitable polymers include polyester soil release polymers. Other suitable polymers include terephthalate polymers, polyurethanes, and mixtures thereof. The soil release polymers, such as terephthalate and polyurethane polymers can be hydrophobically modified, for example to give additional benefits such as sudsing.

Other suitable polymers include polyamines, preferably polyethylene imine polymers, preferably having ethylene oxide and/or propylene oxide functionalized blocks Other suitable polymers include synthetic amino containing amphoteric/and/or zwitterionic polymers, such as those derived from hexamethylene diamine.

Another suitable polymer is a polymer that can be co-micellized by surfactants, such as the AGP described in more detail above.

Other suitable polymers include carboxylate polymers, such as polyacrylates, and acrylate/maleic co-polymers and other functionalized polymers such as styrene acrylates.

Other suitable polymers include silicone, including amino-functionalised silicone.

Other suitable polymers include polysaccharide polymers such as celluloses, starches, lignins, hemicellulose, and mixtures thereof.

Other suitable polymers include cationic polymers, such as deposition aid polymers, such as cationically modified cellulose such as cationic hydroxy ethylene cellulose, cationic guar gum, cationic starch, cationic acrylamides and mixtures thereof.

Mixtures of any of the above described polymers can be used herein.

Zeolite Builder

Suitable zeolite builder includes include zeolite A, zeolite P and zeolite MAP. Especially suitable is zeolite 4A.

Phosphate Builder

A typical phosphate builder is sodium tri-polyphosphate.

Silicate Salt

A suitable silicate salt is sodium silicate, preferably 1.6 R and/or 2.0 R sodium silicate.

Other Detergent Ingredients

The composition typically comprises other detergent ingredients. Suitable detergent ingredients include: transition metal catalysts; imine bleach boosters; enzymes such as amylases, carbohydrases, cellulases, laccases, lipases, bleaching enzymes such as oxidases and peroxidases, proteases, pectate lyases and mannanases; source of peroxygen such as percarbonate salts and/or perborate salts, preferred is sodium percarbonate, the source of peroxygen is preferably at least partially coated, preferably completely coated, by a coating ingredient such as a carbonate salt, a sulphate salt, a silicate salt, borosilicate, or mixtures, including mixed salts, thereof; bleach activator such as tetraacetyl ethylene diamine, oxybenzene sulphonate bleach activators such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; suds suppressing systems such as silicone based suds suppressors; brighteners; hueing agents; photobleach; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as oligomers produced by the condensation of imidazole and epichlorhydrin; soil dispersants and soil anti-redeposition aids such as alkoxylated polyamines and ethoxylated ethyleneimine polymers; anti-redeposition components such as polyesters and/or terephthalate polymers, polyethylene glycol including polyethylene glycol substituted with vinyl alcohol and/or vinyl acetate pendant groups; perfumes such as perfume microcapsules, polymer assisted perfume delivery systems including Schiff base perfume/polymer complexes, starch encapsulated perfume accords; soap rings; aesthetic particles including coloured noodles and/or needles; dyes; fillers such as sodium sulphate, although it may be preferred for the composition to be substantially free of fillers; carbonate salt including sodium carbonate and/or sodium bicarbonate; silicate salt such as sodium silicate, including 1.6 R and 2.0 R sodium silicate, or sodium metasilicate; co-polyesters of di-carboxylic acids and diols; cellulosic polymers such as methyl cellulose, carboxymethyl cellulose, hydroxyethoxycellulose, or other alkyl or alkylalkoxy cellulose, and hydrophobically modified cellulose; carboxylic acid and/or salts thereof, including citric acid and/or sodium citrate; and any combination thereof.

EXAMPLES

Example 1

A Spray-Dried Laundry Detergent Powder and Process of Making it

Aqueous alkaline slurry composition.

| Component | Aqueous slurry (parts) |
|---|---|
| Sodium Silicate | 8.5 |
| Acrylate/maleate copolymer | 3.2 |
| Hydroxyethane di(methylene phosphonic acid) | 0.6 |
| Sodium carbonate | 8.8 |
| Sodium sulphate | 42.9 |
| Water | 19.7 |
| Miscellaneous, such as magnesium sulphate, and one or more stabilizers | 1.7 |
| Aqueous alkaline slurry parts | 85.4 |

Preparation of a Spray-Dried Laundry Detergent Powder

An alkaline aqueous slurry having the composition as described above is prepared in a slurry making vessel (crutcher). The alkaline aqueous slurry is shear thinning and has a viscosity in the range of from 0.5 to 30 Pas at a temperature of 70° C. and at a shear rate of 50 $s^{-1}$. The moisture content of the above slurry is 23.1%. Any ingredient added above in liquid form is heated to 70° C., such that the aqueous slurry is never at a temperature below 70° C. Saturated steam at a pressure of $6.0\times10^5$ Pa is injected into the crutcher to raise the temperature to 90° C. The slurry is then transferred to a drop tank having a volume of 600 liters. The slurry is then pumped into a low pressure line (having a pressure of $5.0\times10^5$ Pa).

Separately, 11.4 parts of $C_8$-$C_{24}$ alkyl benzene sulphonic acid (HLAS), and 3.2 parts of a 50 w/w % aqueous sodium hydroxide solution are pumped into the low pressure line. The viscosity of the alkaline slurry increases. The resultant mixture is then pumped by a high pressure pump into a high pressure line (having an exit pressure of $8.0\times10^6$ Pa).

The total volume of the pipe (all process equipment downstream of the drop-tank: from the point of exiting the drop tank, to the point of exiting the spray nozzle) is 100 liters. The volume of the pipe from the point at which the detergent ingredients are dosed into the pipe (low pressure line) to the end of the pipe exiting the spray-pressure nozzle is 50 liters.

The mixture is then sprayed at a rate of 1,640 kg/hour at a pressure of $8.0\times10^6$ Pa and at a temperature of 90° C.+/−2° C. through a spray pressure nozzle into a counter current spray-drying tower with an air inlet temperature of 300° C. The mixture is atomised and the atomised slurry is dried to produce a solid mixture, which is then cooled and sieved to remove oversize material (>1.8 mm) to form a spray-dried powder, which is free-flowing. Fine material (<0.15 mm) is elutriated with the exhaust the exhaust air in the spray-drying tower and collected in a post tower containment system. The spray-dried powder has a moisture content of 2.5 wt %, a bulk density of 510 g/l and a particle size distribution such that greater than 80 wt % of the spray-dried powder has a particle size of from 150 to 710 micrometers. The composition of the spray-dried powder is given below.

Spray-dried laundry detergent powder composition

| Component | % w/w Spray Dried Powder |
|---|---|
| Sodium silicate salt | 10.0 |
| $C_8$-$C_{24}$ alkyl benzene sulphonate | 15.1 |
| Acrylate/maleate copolymer | 4.0 |
| Hydroxyethane di(methylene phosphonic acid) | 0.7 |
| Sodium carbonate | 11.9 |
| Sodium sulphate | 53.7 |
| Water | 2.5 |
| Miscellaneous, such as magnesium sulphate, and one or more stabilizers | 2.1 |
| Total Parts | 100.00 |

A granular laundry detergent composition.

| Component | % w/w granular laundry detergent composition |
|---|---|
| Spray-dried powder of example 1 (described above) | 59.38 |
| 91.6 wt % active linear alkyl benzene sulphonate flake supplied by Stepan under the tradename Nacconol 90G ® | 0.22 |
| Citric acid | 5.00 |
| Sodium percarbonate (having from 12% to 15% active AvOx) | 14.70 |
| Photobleach particle | 0.01 |
| Lipase (11.00 mg active/g) | 0.70 |
| Amylase (21.55 mg active/g) | 0.33 |
| Protease (56.00 mg active/g) | 0.43 |
| Tetraacetyl ethylene diamine agglomerate (92 wt % active) | 4.35 |
| Suds suppressor agglomerate (11.5 w t% active) | 0.87 |
| Acrylate/maleate copolymer particle (95.7 wt % active) | 0.29 |
| Green/Blue carbonate speckle | 0.50 |
| Sodium Sulphate | 9.59 |
| Solid perfume particle | 0.63 |
| Ethoxylated $C_{12}$-$C_{18}$ alcohol having an average degree of ethoxylation of 7 (AE7) | 3.00 |
| Total Parts | 100.00 |

The above laundry detergent composition was prepared by dry-mixing all of the above particles (all except the AE7) in a standard batch mixer. The AE7 in liquid form is sprayed on the particles in the standard batch mixer. Alternatively, the AE7 in liquid form is sprayed onto the spray-dried powder of example 1. The resultant powder is then mixed with all of the other particles in a standard batch mixer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for preparing a spray-dried detergent powder comprising:

(i) detersive surfactant; and (ii) other detergent ingredients;

wherein the process comprises the steps of:

(a) dosing an aqueous detergent slurry into a drop tank;

(b) transferring the aqueous detergent slurry from the drop tank to a pipe, and transferring the aqueous detergent slurry along the pipe through at least one pump to a spray-pressure nozzle;

(c) contacting a detergent ingredient to the aqueous detergent slurry in the pipe to form a mixture;

(d) spraying the mixture through the spray nozzle into a spray-drying tower; and (e) spray-drying the mixture to form a spray-dried powder, wherein the ratio of (i) the volume of the pipe of step (b) from the drop tank to the spray-pressure nozzle in liters to (ii) the volume of the entire drop tank of step (a) in liters is less than about 1:1;

wherein the ratio of (i) the volume of the pipe in step (b) from the point at which the detergent ingredient is dosed into the pipe to the end of the pipe exiting the spray-pressure nozzle in liters to (ii) the volume of the entire drop tank of step (a) in liters is less than about 0.1:1; and wherein in step (c) the detergent ingredient comprises detersive surfactant and/or an acid precursor thereof.

2. A process according to claim 1, wherein the ratio of (i) the volume of the pipe of step (b) in liters to (ii) the volume of the drop tank of step (a) in liters is less than about 0.2:1.

3. A process according to claim 1, wherein in step (c) the detergent ingredient comprises polymer.

4. A process according to claim 1, wherein in step (c) the detergent ingredient comprises sodium hydroxide.

5. A process according to claim 1, wherein in step (c) the detergent ingredient comprises sodium chloride.

6. A process according to claim 1, wherein in step (c) the detergent ingredient comprises gas.

7. A process according to claim 1, wherein the aqueous detergent slurry comprises from about 0 wt % to about 5 wt % detersive surfactant.

8. A process according to claim 1, wherein the spray-dried detergent powder is spray-dried laundry detergent powder.

9. A process according to claim 1, wherein the spray-dried detergent powder comprises:

(a) from about 0 wt % to about 10 wt % zeolite builder;

(b) from about 0 wt % to about 10 wt % phosphate builder; and (c) optionally from about 0 wt % to about 15 wt % silicate salt.

10. A process according to claim 1, wherein the spray-dried detergent powder comprises:

(a) from about 0 wt % to about 10 wt % zeolite builder;

(b) from about 0 wt % to about 10 wt % phosphate builder; and (c) optionally from about 0 wt % to about 15 wt % silicate salt, wherein the ratio of (i) the volume of the pipe of step (b) in liters to (ii) the volume of the drop tank of step (a) in liters is less than about 0.2:1, wherein the ratio of (i) the volume of the pipe in step (b) from the point at which the detergent ingredient is dosed into the pipe to the end of the pipe exiting the spray-pressure nozzle in liters to (ii) the volume of the drop tank of step (a) in liters is less than about 0.1:1.

* * * * *